United States Patent

Hataya et al.

[15] 3,637,952

[45] Jan. 25, 1972

[54] VOICE CLOCK APPARATUS

[72] Inventors: Yukio Hataya, Neyagawa-shi; Isao Kozu, Osaka; Yasutaka Nakashima, Neyagawa-shi, all of Japan

[73] Assignee: Matsushita Electric Industrial Co. Ltd., Kadoma-shi, Osaka, Japan

[22] Filed: Dec. 22, 1969

[21] Appl. No.: 887,041

[30] Foreign Application Priority Data

Dec. 25, 1968 Japan....................................44/282
Dec. 25, 1968 Japan....................................44/283

[52] U.S. Cl.............179/100.2MD, 179/6 TA, 179/100.1 PS
[51] Int. Cl.....................................G11b 3/36, G11b 27/14
[58] Field of Search.................179/100.1 C, 100.1 PS, 6 TA, 179/100.2 MD

[56] References Cited

UNITED STATES PATENTS 3,075,775 1/1963 Druz...........................179/100.2 MD
2,862,065 11/1958 Franklin.............................179/6 TA
3,440,358 4/1969 Stenby.........................179/100.2 MD
3,469,038 9/1969 Green..........................179/100.2 MD
3,535,465 10/1970 Smith..............................179/100.1 C
2,063,385 12/1936 Koenig.........................179/100.1 PS

*Primary Examiner*—Terrell W. Fears
*Assistant Examiner*—Alfred H. Eddleman
*Attorney*—Stevens, Davis, Miller & Mosher

[57] ABSTRACT

An apparatus for vocally indicating the time of day through a speaker, which comprises medium means having a magnetic layer applied thereover and formed with a plurality of tracks storing voices corresponding to various points of time, a clock mechanism for driving the medium means to shift the tracks in accordance with the lapse of time, a magnetic head for scanning at least one of the tracks to reproduce the time signal stored therein, driving means receiving the drive from a motor for driving the magnetic head, an amplifier for amplifying the reproduced output of the magnetic head, and switch means for connecting the magnetic head with the amplifier.

2 Claims, 2 Drawing Figures

Y. HATAYA, I. KOZU AND
Y. NAKASHIMA INVENTORS

BY Stevens, Davis, Miller & Mosher ATTORNEYS

VOICE CLOCK APPARATUS

This invention relates to a clock apparatus, and more particularly to a voice clock apparatus for vocally indicating the time of day.

The usually used clock indicates time by means of a dial and pointers. It is preferable for the user of a clock to be able to know the time of day as he desires, irrespective of the environment or state in which he happens to be. The conventional clock of the described type, however, does not enable its user to know the time if his environment is dark or if something prevents him from looking at the clock. Further, such a clock is substantially of no use to the blind. Although there is an apparatus of the type which vocally tells the time through the telephone service as provided by the telephone stations, such an apparatus would prove very expensive if it was employed for private use.

It is therefore a general object of the present invention to provide a novel clock apparatus for vocally indicating the time of day.

It is another object of the present invention to provide a novel clock apparatus for vocally indicating the time of day through a low frequency amplifier circuit in a radio receiver set.

It is still another object of the present invention to provide a novel and simply constructed clock apparatus for vocally indicating the time of day by causing a magnetic head to scan medium means having a magnetic layer storing vocal time signals therein.

These objects of the present invention are achieved by a voice clock apparatus which comprises medium means having thereon a magnetic layer formed with a plurality of tracks storing voices corresponding to various points of time, a clock mechanism for driving the medium means to shift the tracks in accordance with the lapse of time, a magnetic head for scanning at least one of the tracks to thereby reproduce the time signal stored therein, driving means for receiving the drive from a motor to drive the magnetic head, an amplifier for amplifying the reproduce output of the magnetic head to provide the time signal in the form of a voice through a speaker, and switch means responsive to the initiation of the scanning effected by the magnetic head to thereby shift the amplifier into a position for amplifying the reproduce output of the magnetic head, but once the scanning by the magnetic head is completed, into a position not for amplifying the reproduce output.

Figure 1:
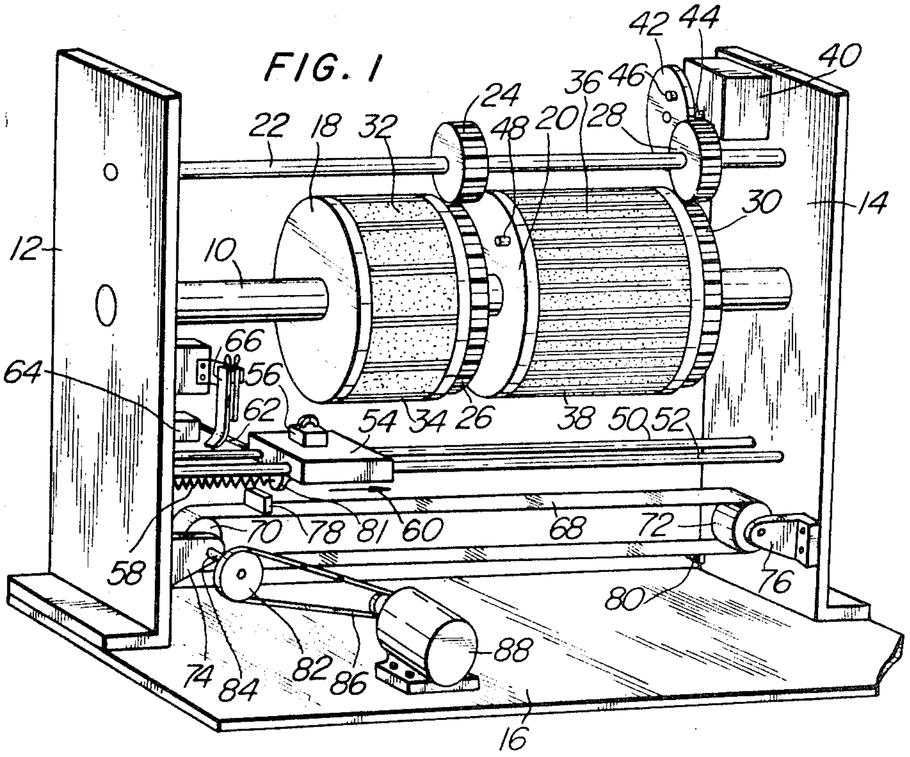
Figure 2:
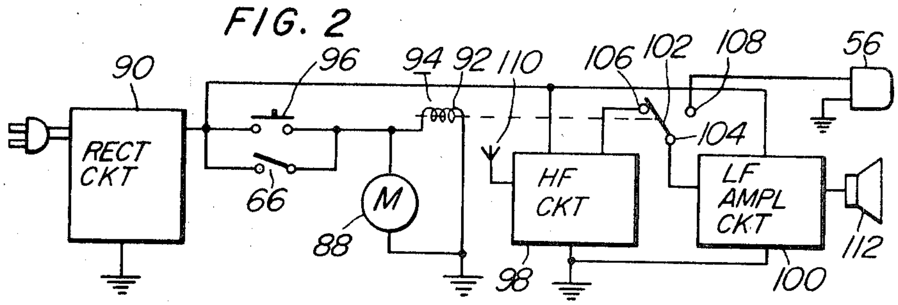

The invention will become fully apparent from the following detailed description thereof taken in conjunction with the accompanying drawings, in which:

FIG. 1 is a perspective view of the voice clock apparatus according to the present invention; and FIG. 2 is a diagrammatic illustration of the electric circuit used with the apparatus of the present invention.

Referring to FIG. 1, there is provided a main shaft 10 extended between and supported by spaced upright side plates 12 and 14 secured on a chassis 16. A first drum 18 and a second drum 20 rotatable separately from each other are mounted in alignment on the main shaft 10. A shaft 22 vertically parallel to the main shaft 10 is also extended between and supported by the opposite side plates 12 and 14. The shaft 22 has a pinion 24 rotatably mounted thereon and the pinion 24 is in mesh engagement with a gear 26 secured to the first drum 24 at one end thereof adjacent to the second drum 20. The shaft 22 has another pinion 28 also rotatably mounted thereon and this pinion 28 is in mesh engagement with a gear 30 secured to the second drum 20 at the outer end thereof. Each of the first and second drums 18 and 20 has a magnetic layer formed over the outer wall surface thereof as will be described in detail, so that these drums serve as medium means. The magnetic layer on the first drum 18 is provided by a magnetic sheet 32 which is applied over the outer wall surface of the drum 18 and lined with a suitable cushion member. On the outer surface of the magnetic sheet 32 there is formed a plurality of equally spaced tracks 34 parallel to the main shaft 10 and these tracks 34 may store therein a plurality of time signals corresponding to the "hours " of day. According to the illustrated embodiment of the present invention, the time signals prerecorded in the respective tracks 34 are voice signals representing the points of time such as "one o'clock, " "two o'clock, " . . . and "twelve o'clock," and thus are provided 12 tracks on the magnetic sheet 32. The magnetic layer on the second drum 20 is provided by a magnetic sheet 36 which is applied over the outer wall surface of the drum 20 and lined with a suitable cushion member. On the outer surface of the magnetic sheet 36 there if formed a plurality of equally spaced tracks 38 parallel to the main shaft 10 and these tracks 38 on the magnetic sheet 36 may store therein a plurality of time signals corresponding to the "minutes. " According to the illustrated embodiment, the time signals prerecorded in these respective tracks 38 are voice signals representing the points of time such as "just," "1 minute, " "2 minutes, " . . . and "59 minutes, " and thus there are provided 60 tracks on the magnetic sheet 36. A clock mechanism 40 driven by a suitable motor or a spiral spring (not shown) is mounted on the upper portion of the side plate 14 and a disc 42 is securely connected to the output shaft 44 of the clock mechanism 40 so that the disc 42 is driven from the clock mechanism 40 for a full rotation per minute. The disc 42 has a pin 46 studded therein and engageable with the pinion 28 on the shaft 22. A full rotation of the disc 42 causes the pin 46 to rotate the pinion 28 at a predetermined angle. Such rotation of the pinion 28 also causes the gear 30 engaged with the pinion 28 to rotate at an angle corresponding to one pitch of the tracks 38 on the second drum 20. Thus, according to the shown embodiment, the second drum 20 is rotated an angle of 6° every minute, which means that the second drum 20 makes a full rotation in an hour.

The second drum 20 has a pin 48 studded in the end surface thereof facing the first drum 18 and this pin 48 is engageable with the pinion 24 mounted on the shaft 22. When the second drum 20 is rotated so that the track thereon scanned by a magnetic head which will be described later is shifted from a track corresponding to "59 minutes " to a track corresponding to "-just," the pin 48 engaging the pinion 24 causes the same pinion to rotate a predetermined angle. This rotation of the pinion 24 also causes the gear 26 of the first drum 18 to rotate an angle corresponding to one pitch of the tracks 34 on the drum 18. Thus, according to the illustrated embodiment, the first drum 18 rotates an angle of 30° every hour, which means that the first drum 18 effects a full rotation in 12 hours.

If adjustment is previously made so that one of the tracks 34 and one of the tracks 38 which respectively store the voice signals corresponding to the current hour and minute come to the position in which these two particular tracks are scanned by the magnetic head to be described, then the drums 18 and 20 will be driven by the clock mechanism 40 with the lapse of time, and thereby an appropriate one of the tracks 34 and an appropriate one of the tracks 38 corresponding to each current hour and minute will always be brought into opposed relationship with the scanning path of the magnetic head.

By and between the side plates 12 and 14 are also supported a pair of horizontally parallel guide bars 50 and 52 which underlie the first and second drums 18 and 20. These guide bars 50 and 52 carry thereon a slidably mounted carriage 54 having a magnetic head 56 mounted on top thereof. The magnetic head 56 can scan one of the tracks 34 on the first drum and one of the tracks 38 on the second drum 20 at a time. The carriage 54 is urged by a tension spring 58 in the opposite direction to that shown by an arrow 60, and normally takes the rest position in which a pin 62 secured to the carriage 54 is engaged with a stopper 64 attached inwardly of the side plate 12 so that the carriage 54 is maintained stationary under the tension of the spring 58. In the shown position the pin 62 also engages a normally closed rest switch 66 attached to the side plate 12 to thereby open the rest switch 66. Pulleys 70 and 72 are rotatably supported by brackets 74 and 76 secured to the respective side plates 12 and 14, and these pulleys 70 and 72 have an endless belt 68 disposed thereon which extends parallel with the aforementioned guide bars 50 and 52. The endless belt 68 has two kickers 78 and 80 secured on the outer surface thereof. These kickers are located so that they divide the endless belt 68 into two equal lengths. The kickers 78 and 80 are engageable with a tab portion 81 of the carriage 54 so that the carriage is driven in the direction shown by the arrow 60 in accordance with the movement of the endless belt 68. A further pulley 82 is secured on the shaft 84 of the pulley 70 at one end thereof and the pulley 82 is driven for a required length of time through an endless rope 86 from a motor 88 mounted on the chassis 16.

The voice clock apparatus according to the present invention can be more effective and inexpensive when applied in a radio receiver such as radio or television set, and description will now be made of the electric circuit of the voice clock apparatus as applied in a radio set, with reference to FIG. 2.

In FIG. 2, a DC power produced by a rectifier circuit 90 is supplied to the motor 88 and the coil 92 of a relay 94 through an operation switch 96 and the rest switch 66 connected in parallel therewith. The DC power is also supplied directly to a high frequency circuit 98 constituting the radio set (including a high frequency amplifier circuit, a local oscillation circuit, a converter circuit, an intermediate frequency amplifier circuit, etc.) and to a low frequency amplifier circuit 100. The high frequency circuit 98, the low frequency amplifier circuit 100 and the magnetic head 56 are connected together by means of a changeover switch 102 of the relay 94 in the manner as described hereunder. A movable contact 104 of the changeover switch 102 is connected with the input terminal of the low frequency amplifier circuit 100, while one of fixed contacts indicated by 106 is connected with the output terminal of the high frequency circuit 98 and the other fixed contact 108 is connected with the output terminal of the magnetic head 56.

When the operation switch 96 is not depressed, the rest switch 66 is maintained open by the pin 62 of the carriage 54 as described previously, and thus no current is passed to the motor 88 and to the coil 92 of the relay 94. In this state of the circuit, the movable contact 104 has been changed over into connection with the fixed contact 106 as shown in FIG. 2. As a result, the radiobroadcast program received by an antenna 110 of the radio receiver set is supplied through the high frequency circuit 98 to the low frequency amplifier circuit 100 so that the program can be heard through a speaker 112.

In operation, as described previously, the first drum 18 and the second drum 20 are driven from the clock mechanism 40 in such a manner that the tracks 34 and 38 on the respective drums are successively brought into opposed relationship with the scanning path of the magnetic head 56 as time elapses.

In FIG. 2, if the operation switch 96 is depressed by the operator at a desired point of time, power is supplied to the motor 88 and the coil 92 of the relay 94 through the rectifier circuit 90. This causes the changeover switch 102 to be changed over so as to engage its movable contact 104 with its fixed contact 108. Thus, the reproduce output of the magnetic head 56 is applied to the low frequency amplifier circuit 100. Consequently, in FIG. 1, the rotation of the motor 88 is transmitted through the endless rope 86 to the pulley 82 which is thereby rotated. As a result, the endless belt 68 is caused to move so that the kicker 78 on the belt 68 is also displaced in the direction shown by the arrow 60. In the initial stage of its displacement, the kicker 78 pushes the tab portion 81 of the carriage 54 in the direction of the arrow 60. As the carriage 54 starts to be moved thereby against the tension of the spring 58, the pin 62 is disengaged with the rest switch 66 which is thereby changed over into closed state. Therefore, in FIG. 2, the power supply to the motor 88 and relay 94 is maintained even if the operation switch 96 is released by the operator.

As the carriage 54 is further moved against the force of the spring 58 by the kicker 78 on the endless belt 68, the magnetic head 56 on the carriage 54 scans one of the tracks 34 on the first drum 18 to thereby reproduce a time signal representing the "hour," and further scans one of the tracks 38 on the second drum 20 to thereby reproduce a time signal representing the "minute." These reproduce outputs are amplified by the low frequency amplifier circuit 100 so as to be provided in the form of a voice through the speaker 112.

When the kicker 78 on the moving belt 68 reaches the pulley 72 to start rotating thereabout, the engagement between the kicker 78 and the tab portion 81 of the carriage 54 is released so that the carriage 54 is forced to return to its original position, i.e., rest position by the biasing force of the tension spring 58. Thereupon, the pin 62 of the carriage 54 pushes the rest switch 66 which is thus changed over into open state. As a consequence, the power is cut off to the motor 88 and relay 94 so that the motor is stopped from rotating and the low frequency amplifier circuit 100 is connected with the high frequency circuit 98 to thereby return the entire circuit to the radiobroadcast receiving position. By that time the other kicker 80 on the endless belt 68 has already been brought into the initial position as previously taken by the kicker 78.

If the operation switch 96 is kept depressed by the operator for a long time, the power supply to the motor 88 and relay 94 is not cut off for that length of time, whereby the kicker 80 pushes the tab portion 81 of the carriage 54 so as to cause the magnetic head 56 again to effect the scanning. Thus, the kickers 78 and 80 alternately perform the described action to enable the magnetic head 56 to repeat its scanning operation until the operation switch 96 is released by the operator. In this way the operator can hear the reproduced time signal as often as he desires.

In the shown arrangement, the first drum 18 has tracks formed thereon, whereas the number of the tracks on the first drum may be 24 corresponding to the 24 hours of a day from "0 o'clock " to "twenty-three o'clock, " so that the first drum makes a full rotation in a day. Also, the number of the tracks 38 formed on the second drum 20 may be reduced so that time signals representing the "minute " are reproduced at intervals of 3 or 5 minutes. Further, if required, a third drum may be added for reproducing time signals representing the unit of "-second. "

While the above embodiment is shown to use a plurality of magnetic drums serving as medium means having time signals prerecorded therein, it will be readily possible to use medium means provided by a plurality of discs having magnetic sheets applied thereover and adapted to rotate in accordance with the lapse of time. Also, the driving means for driving the magnetic head is shown as an endless belt 68, whereas it will again be readily feasible to constitute the driving means by a feed screw for driving the carriage 54.

Further, the time signals used in the illustrated embodiment are voice signals, but the present invention does not prevent the additional use of visible indication means such as a dial and pointers driven by the clock mechanism.

It will be apparent to those skilled in the art that various modifications may be made without departing from the spirit of the invention. The above-described specific examples are intended merely to illustrate various facets in certain selective embodiments of the invention, the scope of which it is intended shall be limited only by the appended claims.

What is claimed is:

1. A voice clock apparatus comprising a first rotating member having a magnetic layer applied thereon, said magnetic layer being formed with a plurality of tracks storing vocal time signals corresponding to hours;

a second rotating member having a magnetic layer applied thereon, said magnetic layer being formed with a plurality of tracks storing vocal time signals corresponding to minutes;

means, including a clock mechanism, for driving said rotating members to rotate one pitch of the tracks thereon in accordance with a predetermined period of time;

means, including a magnetic head carried on a head supporting carriage, for scanning one of the tracks on each of said rotating members to thereby reproduce the vocal time signal stored on said track;

means including a tension spring, for biasing said carriage to return said magnetic head to its rest position;

driving means circulatively driven by a motor and engageable with said carriage at the rest position to move said magnetic head against the biasing force of said tension spring;

means, including broadcast receiver amplifier, for amplifying the output reproduced by said magnetic head;

an operation switch connecting a power source with said motor for driving said magnetic head;

means, including a rest switch responsive to the initiation of the scanning by said magnetic head and connected in parallel to said operation switch, for maintaining the electric connection of the power source with said motor after disconnection of said power switch until the magnetic head returns to its rest position; and means, including a changeover switch responsive to said operation switch and said rest switch, for connecting said amplifier to said magnetic head during the scanning of said rotating members by said magnetic head to reproduce the signal recorded on said rotating members so that the vocal time signal corresponding to a current point of time stored in the tracks is broadcast through a speaker in said radiobroadcast receiver set;

wherein after the termination of the scanning by said magnetic head, said driving means is disengaged from said carriage, said carriage is returned to the rest position under the biasing force of said tension spring, said rest switch is disconnected, said motor is disconnected from the power source and said amplifier is disconnected from the output of said magnetic head and connected to said broadcast receiver for amplifying a radiobroadcast program received by said radiobroadcast receiver set.

2. An apparatus as defined in claim 1, wherein said magnetic head is carried on a carriage guided for linear movement by guide bars, and said driving means comprises an endless belt having kickers thereon engageable with said carriage at the rest position to move the latter, two pulleys for disposing said belt thereon, and a motor for driving one of said pulleys, whereby movement of said belt causes said kickers to drive said carriage so that said magnetic head linearly scans the tracks on said rotating members.

* * * * *